(12) United States Patent
Lee

(10) Patent No.: US 11,374,424 B2
(45) Date of Patent: Jun. 28, 2022

(54) BATTERY MANAGEMENT SYSTEM

(71) Applicant: SK INNOVATION CO., LTD., Seoul (KR)

(72) Inventor: Yong Hee Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 182 days.

(21) Appl. No.: 16/779,113

(22) Filed: Jan. 31, 2020

(65) Prior Publication Data
US 2020/0251921 A1 Aug. 6, 2020

(30) Foreign Application Priority Data
Feb. 1, 2019 (KR) .......................... 10-2019-0013806

(51) Int. Cl.
*H02J 7/00* (2006.01)
*H01M 10/42* (2006.01)
*H01M 10/48* (2006.01)

(52) U.S. Cl.
CPC ..... *H02J 7/007194* (2020.01); *H01M 10/425* (2013.01); *H01M 10/482* (2013.01); *H01M 10/486* (2013.01); *H02J 7/0047* (2013.01); *H02J 7/00712* (2020.01); *H01M 2010/4271* (2013.01); *H01M 2220/20* (2013.01)

(58) Field of Classification Search
USPC ................. 320/110, 111, 112, 135, 136, 137
See application file for complete search history.

(56) References Cited

U.S. PATENT DOCUMENTS

| | | | |
|---|---|---|---|
| 2001/0022518 A1* | 9/2001 | Asakura | H02M 3/07 324/426 |
| 2016/0254687 A1* | 9/2016 | Tanaka | H01M 10/44 320/112 |
| 2017/0125860 A1* | 5/2017 | Chatroux | H01M 10/617 |

FOREIGN PATENT DOCUMENTS

| | | | | |
|---|---|---|---|---|
| CN | 103081216 A | * | 5/2013 | .......... H01M 10/486 |
| CN | 105277890 A | * | 1/2016 | .......... B60L 11/1861 |
| DE | 10164771 B4 | * | 7/2006 | .......... H01M 10/052 |
| EP | 2851701 A2 | | 3/2015 | |
| EP | 3089311 A1 | | 11/2016 | |
| JP | 4039355 B | | 1/2008 | |
| KR | 10-0802310 B | | 2/2008 | |
| WO | 2017/002292 A | | 4/2018 | |
| WO | WO-2018235995 A1 | * | 12/2018 | ............. G01R 31/36 |

OTHER PUBLICATIONS

Extended Search Report Issued by European Patent Office dated Jun. 19, 2020.

* cited by examiner

*Primary Examiner* — Brian Ngo
(74) *Attorney, Agent, or Firm* — IP & T Group LLP

(57) ABSTRACT

Provided is a battery management system capable of deliberately discharging a battery to suppress deterioration of the battery due to gas generated in the battery that is left non-used at a high temperature for a long time. The battery management system, which aims to prevent generation of gas in the battery left non-used at a high temperature, is provided to prevent generation of gas in the battery in advance by deliberately discharging the battery to reduce a charged amount of the battery when a temperature, a charged amount, and a non-used period are in a preset level range.

17 Claims, 7 Drawing Sheets

BATTERY MANAGEMENT SYSTEM

CROSS-REFERENCE TO RELATED APPLICATIONS

This application claims priority under 35 U.S.C. 119 to Korean Patent Application No. 10-2019-0013806, fled on Feb. 1, 2019, in the Korean Intellectual Property Office, the disclosure of which is incorporated herein by reference in its entirety.

TECHNICAL FIELD

The following disclosure relates to a battery management system, and more particularly, to a battery management system capable of preventing deterioration of a battery.

BACKGROUND

As the demand for electric vehicles gradually increasing, the importance of batteries for driving the electric vehicles has been increasing. In particular, it has been increasingly important to develop a battery cell enabling long-distance driving with one-time charging. However, it is not possible to increase the number of battery cells mounted in an electric vehicle because of restrictions on the vehicle's weight and volume. It is thus required to increase an energy density of a battery instead. Accordingly, studies are being actively conducted to apply a secondary battery material having high reactivity in order to increase the energy density of the battery cell.

As the secondary battery material having high reactivity, i.e. a high capacity material, contains ions having more active materials that are involved in an electrode reaction of the battery, the battery has a higher capacity. The capacity and rated voltage of the battery are determined depending on what cathode active material is used. However, while the material having high reactivity is capable of increasing the capacity of the battery, it causes generation of gas in a larger amount than the conventional materials.

FIGS. 1A and 1B illustrate graphs for comparing degradation phenomena in a battery made of a conventional material and a battery made of a material having high reactivity when left non-used at a high temperature. As illustrated in FIG. 1A, the battery made of a conventional material is kept stable while its pouch does not burst for 32 weeks or more even though it is lea non-used in a highly-charged state and in a high-temperature condition. As illustrated in FIG. 1B, however, in the battery made of a material having high reactivity, a large amount of gas is generated within 12 weeks when it is left non-used in a highly-charged state and in a high-temperature condition, resulting in a venting phenomenon which the pouch of the battery bursts. Based thereon, may be recognized that the battery cell is damaged relatively quickly. That is, when the battery made of a material having high reactivity is left non-used at a high temperature in a highly-charged state, the battery may deteriorate due to a degradation phenomenon, thereby lowering a chargeable amount.

In order to solve this problem, it is conventionally proposed to measure a venting pressure of the battery cell and generate an alarm or induce a venting direction. When the degradation phenomenon of the cell, in which gas is generated in the battery cell, is started, the charging capacity of the battery is reduced, and there is a limit in solving the problem of battery durability because the deterioration of the battery due to the degradation that has once occurred is not reversible.

SUMMARY

An embodiment of the present invention is directed to providing a battery management system preventing generation of gas in the battery in advance by deliberately discharging the battery to lower a charged amount of the battery when a temperature, charged amount, and non-used period of a battery cell are in a preset level range.

In one general aspect, a battery management system for managing a battery pack including one or more battery cells electrically connected to each other includes: a monitoring unit measuring state information of the battery cell; and a degradation management unit including a receiving unit receiving the state information of the battery cell from the monitoring unit, a determination unit determining whether a value of the received state information of the battery cell is in a preset level range, and a control unit controlling the battery cell to be discharged when the value of the received state information of the battery cell in the preset level range.

The monitoring unit may measure a temperature of the battery cell, a charged amount of the battery cell, and a non-used period during which the battery cell is left non-used while not being used, and the degradation management unit may set the level range for discharging the battery cell depending on the measured temperature, charged amount, and non-used period of the battery cell.

The level range may be set in a plural number. When the determination unit of the degradation management unit determines that a first level range is satisfied and the battery cell is discharged to have a predetermined charged amount, the monitoring unit may monitor the battery cell until a second level range is satisfied.

The battery management system may monitor a temperature and a charged amount of each battery cell independently, determine whether each battery cell satisfies the preset level range for discharging the battery cell, and control discharging operation of each battery cell.

The battery management system may monitor a temperature and a charged amount of each battery cell independently, determine whether the preset level range for discharging the battery cell is satisfied on the basis of average values of temperatures and charged amounts of all of the battery cells, and control discharging operation.

The battery management system may use energy discharged from the battery cell to operate an electronic device installed in a vehicle.

In another general aspect, a battery management method using the above-described battery management system according to the present invention includes a monitoring step of measuring a temperature, a charged amount, and a non-used period of the battery cell; a high temperature exposure non-using storage level changing step of discharging the battery cell when a value measured in the monitoring step satisfies the preset level range; and a stabilization level returning step of measuring a charged amount of the battery cell discharged in the high temperature exposure non-using storage level changing step and stopping the discharging of the battery cell when the measured charged amount is equal to or smaller than a predetermined charged amount.

The level range may be set in a plural number on the basis of the temperature of the battery cell, the charged amount of the battery cell, and the non-used period of the battery cell.

The battery management method may be repeated as many as the number of preset level ranges.

Criteria for the level range may be changed each time the battery management method is repeated.

The battery management method may further include using energy discharged from the battery cell to operate an electronic device installed in a vehicle.

DETAILED DESCRIPTION OF MAIN ELEMENTS

Figure 1A:
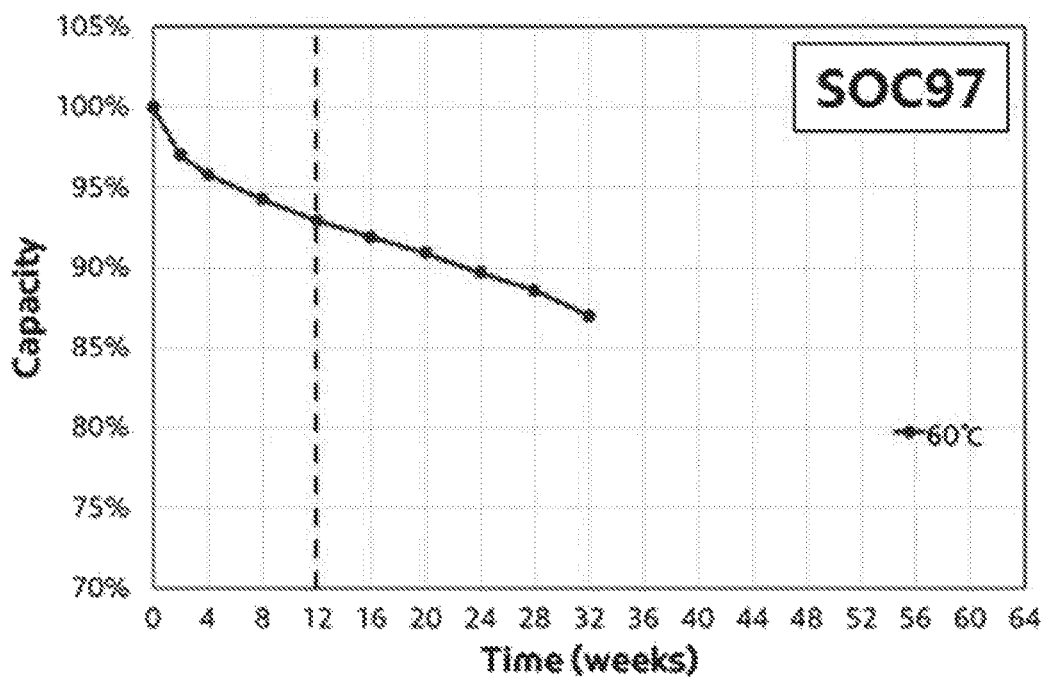
FIGS. 1A and 1B illustrate graphs for comparing degradation phenomena at the time of negligence at a high temperature.
Figure 1B:
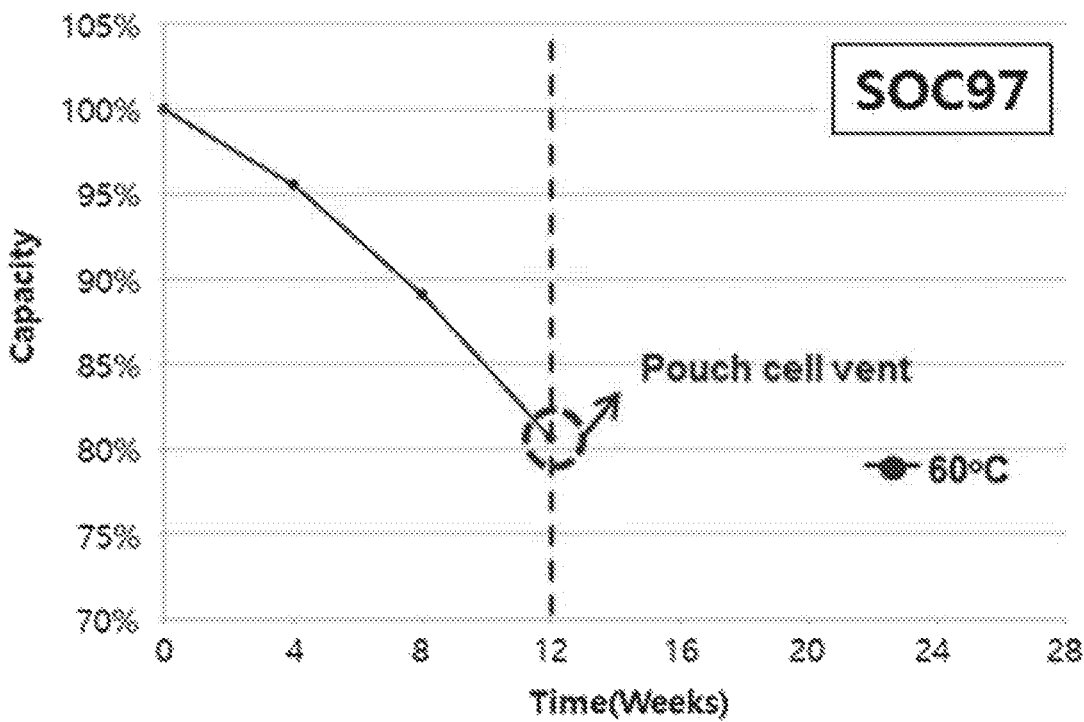

1: Battery pack
10: Battery cell
1000: Battery management system
100: Monitoring unit
110: Temperature measurement unit
120: Charged amount measurement unit
130: Period measurement unit
200: Degradation management unit
210: Receiving unit
220: Determination unit
230: Control unit
300: Level range
310: First level range
320: Second level range
330: Third level range

DETAILED DESCRIPTION OF EMBODIMENTS

Hereinafter, an exemplary embodiment of the present invention will be described in detail with reference to the accompanying drawings.

Elements included in a battery management system according the present invention and functions of each element will be described in more detail with reference to the block diagram of FIG. 2.

Figure 2:
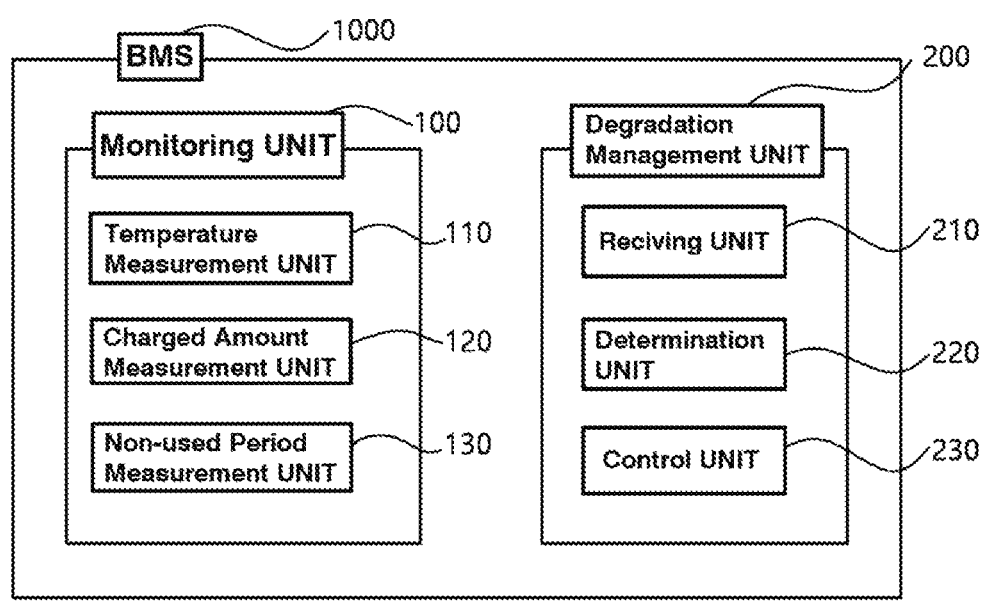
FIG. 2 illustrates a block diagram of a battery management system according to an exemplary embodiment of the present invention.

FIG. 2 illustrates a block diagram of a battery management system according to an exemplary embodiment of the present invention. As illustrated in FIG. 2, the battery management system 1000 according to the present invention largely includes a monitoring unit 100 monitoring a state of a battery cell 10 and a degradation management unit 200 receiving a value measured by the monitoring unit 100 and controlling operation of the battery cell 10 depending on the value measured by the monitoring unit 100.

The monitoring unit 100 includes a temperature measurement unit 110, a charged amount measurement unit 120, and a period measurement unit 130. The temperature measurement unit 110 measures a temperature of the battery cell 10, the charged amount measurement unit 120 measures a charged amount of the battery cell 10, and the period measurement unit 130 measures a period during which the battery cell 10 is left non-used. The monitoring unit 100 according to an exemplary embodiment of the present invention is configured to measure the temperature, the charged amount, and the non-used period of the battery cell 10 in units of time, but may also measure other various state values of the battery cell 10.

The degradation management unit 200 includes a receiving unit 210, a determination unit 220, and a control unit 230. The receiving unit 210 receives measured values from the temperature measurement unit 110, the charged amount measurement unit 120, and the period measurement unit 130. The determination unit 220 determines whether to discharge the battery cell 10 by comparing the values received by the receiving unit 210 with a preset level range. The control unit 230 controls the operation of the battery cell 10 according to the determination result of the determination unit 220. In this case, the level range of the condition for discharging the battery cell 10 may be set in a plural number. If a first level range of the discharging condition is satisfied and the battery cell 10 is discharged to have a predetermined charged amount, the monitoring unit 100 monitors the battery cell 10 until a second level range is satisfied.

Meanwhile, the battery management system according to the present invention monitors the temperature and the charged amount of each battery cell independently, determines whether each battery cell satisfies the level range for discharging the battery cell, and controls discharging operation of each battery cell. In another exemplary embodiment, the battery management system according to the present invention may determine whether average values of temperatures and charged amounts of all of the battery cells satisfy the level range for discharging the battery cell and control the discharge operation, while monitoring the temperature and the charged amount of each battery cell independently. When the discharging operation is controlled on the basis of each battery cell, it is possible to more sensitively prevent generation of gas in the battery. When the discharging operation is controlled on the basis of the average value of all of the battery cells, it is possible to prevent a reduction of a total charged amount due to an abnormality of a specific battery.

Figure 3A:
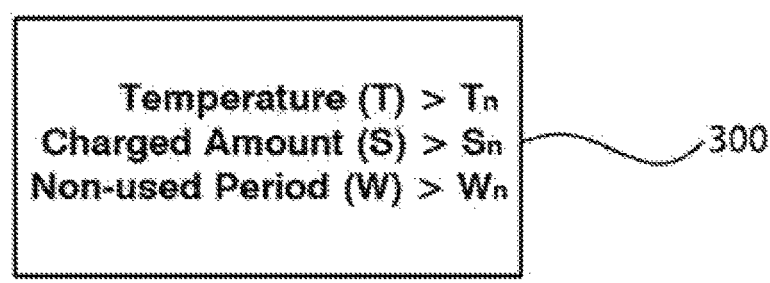
FIGS. 3A and 3B illustrate diagrams exemplifying a level range of a battery management system according to an exemplary embodiment of the present invention.
Figure 3B:
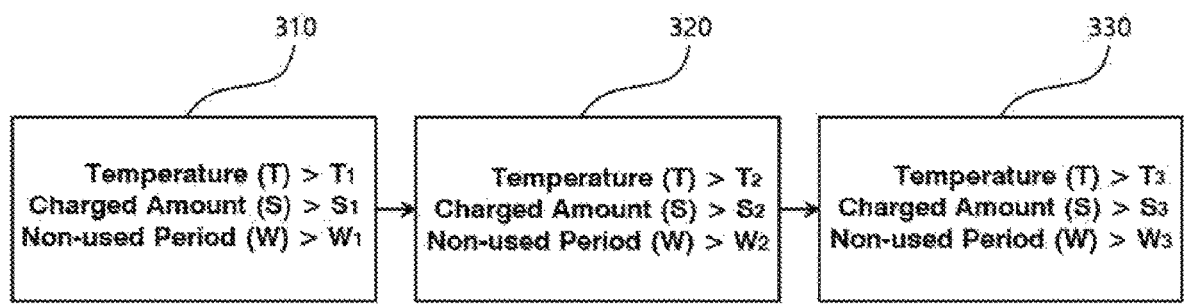

The above-described level range will be described in more detail with reference to FIGS. 3A and 3B. FIGS. 3A and 3B illustrate diagrams exemplifying a level range of a battery management system according to an exemplary embodiment of the present invention. As illustrated in FIG. 3A, the temperature of the battery cell 10 is T (° C.), the charged amount of the battery cell 10 is S (%), and the non-used period of the battery cell 10 is W (week). If T, S and W values exceed $T_n$, $S_n$, and $W_n$, which are included in a preset level range (300), the battery cell 10 is discharged. Here, although the period measurement unit of the battery management system 1000 according to the present invention sets the non-used period of the battery cell 10 on a weekly basis, it may also be set on a daily basis.

As illustrated in FIG. 33, the level range 300 may be set in a plural number. In a first level range 310, when the temperature T is higher than a first level temperature $T_1$, the charged amount S is greater than a first level charged amount $S_1$, and the non-used period W is longer than a first level non-used period $W_1$, the battery cell 10 is discharged. As an example, for the first level range 310, the first level temperature $T_1$ is set as 60° C., the first level charged amount $S_1$ is set as 97, and the first level non-used period $W_1$ is 1. That is, when the temperature of the battery cell 10 monitored by the monitoring unit 100 exceeds 60° C., the charged amount exceeds 97, and the non-used period exceeds one week, the battery is discharged. In this case, the battery is discharged until the charged amount of the battery cell 10 is 90 or less.

In addition, in a second level range 320, when the temperature T is higher than a second level temperature $T_2$, the charged amount S is greater than a second level charged amount $S_2$, and the non-used period W is longer than a second level non-used period $W_2$, the battery cell 10 is discharged. As an example, for the second level range 320, the second level temperature $T_2$ is set as 65° C., the second level charged amount $S_2$ is set as 90, and the second level non-used period $W_2$ is 2. That is, when the temperature of the battery cell 10 monitored by the monitoring unit 100 exceeds 65° C., the charged amount exceeds 97, and the non-used period exceeds two weeks, the battery is discharged. In this case, the battery is discharged until the charged amount of the battery cell 10 is 80 or less.

In a third level range 330, when the temperature T is higher than a third level temperature $T_3$, the charged amount S is greater than a third level charged amount $S_3$, and the non-used period W is longer than a third level non-used period $W_3$, the battery cell 10 is discharged. As an example, for the third level range 330, the third level temperature $T_3$ is set as 70° C., the third level charged amount $S_3$ is set as 80, and the third level non-used period $W_3$ is 3. That is, when the temperature of the battery cell 10 monitored by the monitoring unit 100 exceeds 70° C., the charged amount exceeds 80, and the non-used period exceeds three weeks, the battery is discharged. In this case, the battery is discharged until the charged amount of the battery cell 10 is 50 or less. Here, the Tn, Sn, and Wn values set for each level range and the discharged amount of the battery cell 10 when reaching the level range may be arbitrarily set by a user.

Since the battery cell 10 is monitored while each level range for discharging the battery cell 10 is set differently according to the present invention as described above, it is possible to appropriately prevent generation of gas in the battery cell 10 according to the non-used period and environment even though a vehicle is left non-used for a long time.

Figure 4:
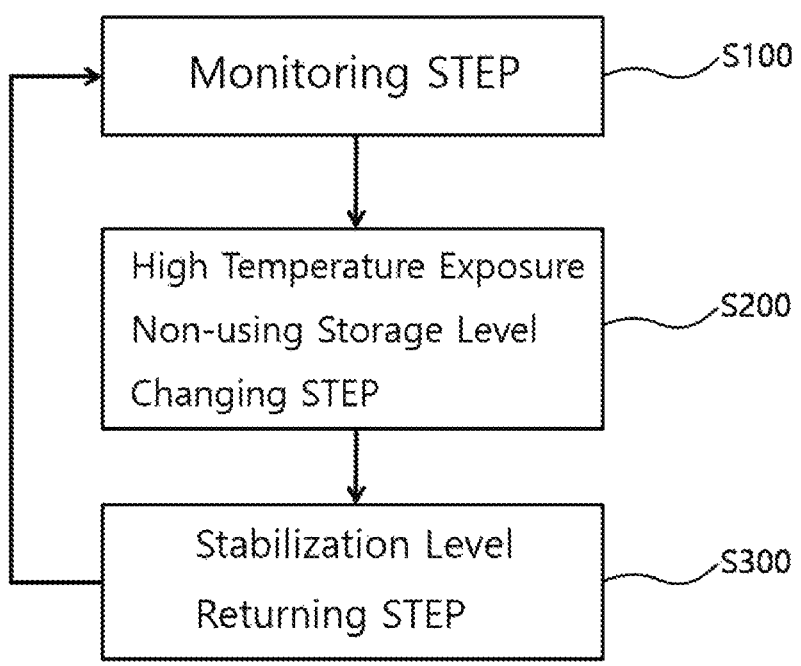
FIG. 4 illustrates a flowchart of a battery management method using a battery management system according to an exemplary embodiment of the present invention.

FIG. 4 illustrates a flowchart a battery management method using a battery management system according to an exemplary embodiment of the present invention. As illustrated in FIG. 4, the battery management method using the battery management system 1000 according to the present invention includes a monitoring step (S100), a high temperature exposure non-using storage level changing step (S200), and a stabilization level returning step (S300), which are sequentially performed. The three steps are repeated as many as the number of level ranges 300, and the level range is changed for each repetition.

The battery management method will be described in more detail with reference to FIGS. 5 and 6. In the monitoring step (S100), the monitoring unit 100 measures a temperature, a charged amount, and a non-used period of the battery cell 10. In the high temperature exposure non-using storage level changing step (S200), the values measured in the monitoring step (S100) are compared with values in the preset level range, and the battery cell 10 is discharged by itself to lower a charged amount thereof when the measured values correspond to the values in the preset level range. The stabilization level returning step (S300) is a step of stopping the discharging of the battery cell 10 when it is determined that the battery cell 10 is discharged to have a predetermined charged amount. If the discharging is performed as many as the number of preset level ranges, a termination step (S400) is performed. If the discharging is performed in a smaller number of times than the number of preset level ranges, the monitoring step (S100) is performed again.

Figure 5:
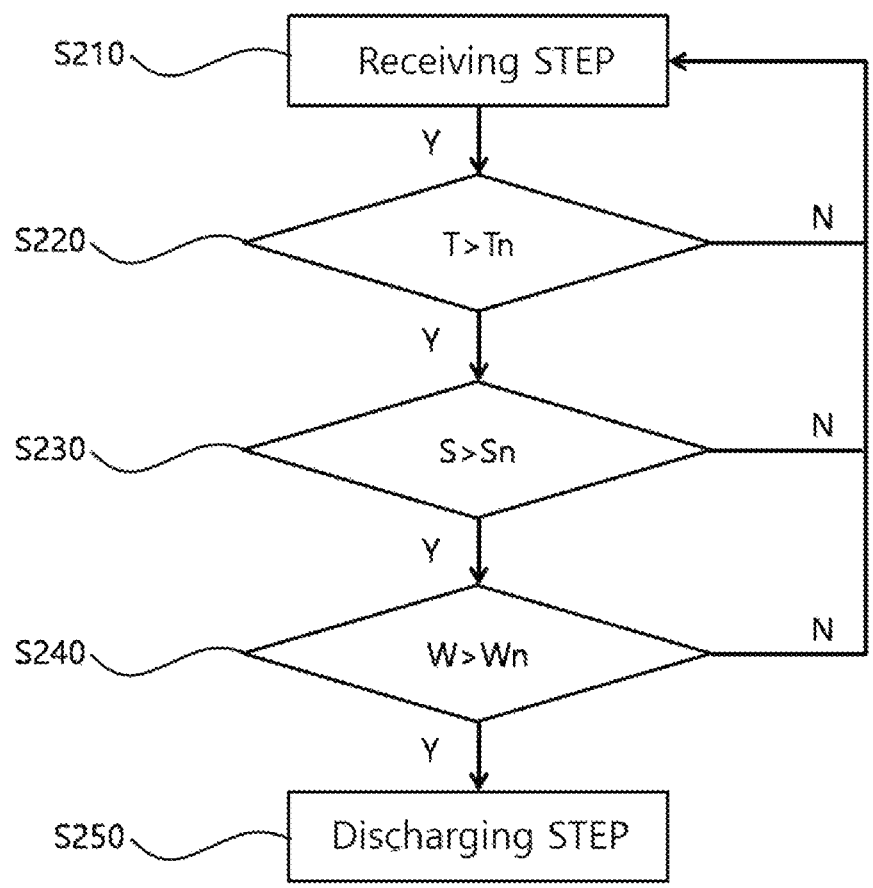
FIG. 5 illustrates a flowchart of a high temperature exposure non-using storage level changing step of a battery management method using a battery management system according to an exemplary embodiment of the present invention.

FIG. 5 illustrates a flowchart of the high temperature exposure non-using storage level changing step of the battery management method using the battery management system according to an exemplary embodiment of the present invention. As illustrated in FIG. 5, the high temperature exposure non-using storage level changing step (S200) includes: a receiving step (S210) of receiving values of the temperature T, the charged amount S, and the non-used period W of the battery cell 10 measured in the monitoring step (S100); a first determination step (S220) of comparing the temperature value of the battery cell 10 measured in the monitoring step S100 with a temperature value set for the level range 300; a second determination step (S230) of comparing the charged amount value of the battery cell 10 measured in the monitoring step (S100) with a charged amount value set for the level range 300; a third determination step (S240) of comparing the non-used period of the battery cell 10 measured in the monitoring step (S100) with a non-used period set for the level range 300; and discharging step (S250) of discharging the battery cell 10 by itself when the values measured in the monitoring step (S100) satisfy the level range 300. In other words, when the temperature, the charged amount, and the non-used period of the battery cell 10 are satisfied at the same time, the battery cell 10 is discharged. For example, on the assumption that a first level range 310 is set, when the temperature of the battery cell 10 exceeds 60° C., the charged amount exceeds 97, and the non-used period exceeds one week, the discharging step (S250) is performed. When the temperature of the battery cell 10 is 62° C., the charged amount is 98, and the non-used period is 3 days, the discharging step (S250) is not performed because the third determination step (S240) is not satisfied.

Figure 6:
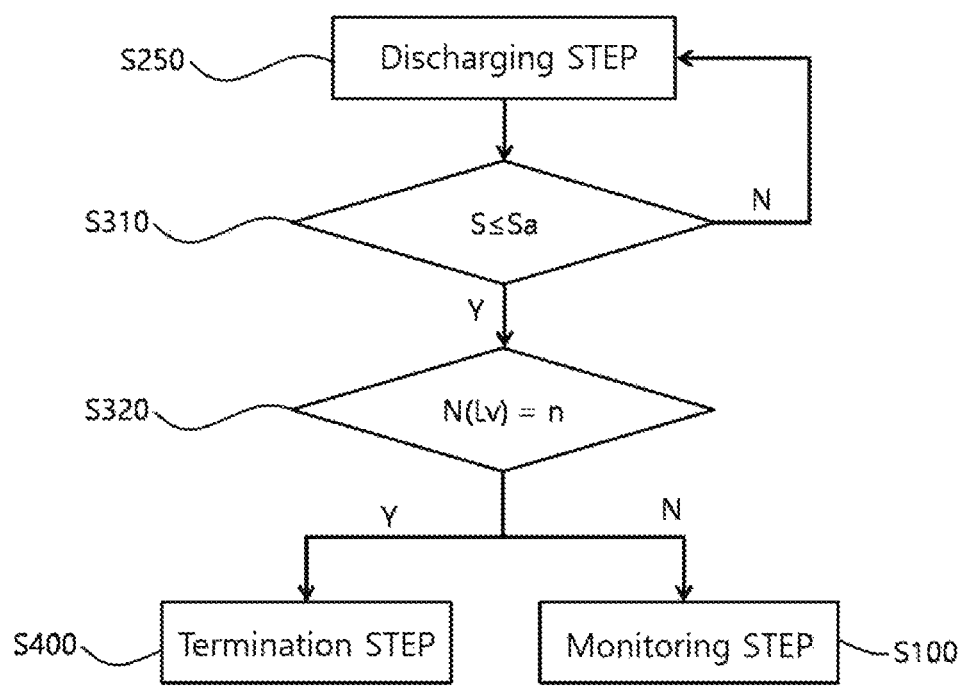
FIG. 6 illustrates a flowchart of a stabilization level returning step of a battery management method using a battery management system according to an exemplary embodiment of the present invention.

FIG. 6 illustrates a flowchart of the stabilization level returning step of the battery management method using the battery management system according to an exemplary embodiment of the present invention. As illustrated in FIG. 5, the discharging step (S250) is performed when the battery cell 10 satisfies the preset level range 300 in the high temperature exposure non-using storage level changing step (S200). However, a fourth determination step (S310) of comparing the charged amount of the battery cell 10 with a predetermined charged amount Sa is performed because the battery cell 10 is not completely non-used but non-used only until the stabilization level. When the battery cell 10 reaches the predetermined charged amount Sa, the discharging of the battery cell 10 is terminated.

Thereafter, a fifth determination step (S320) of comparing the number of times when the battery cell 10 is discharged is performed with the number of preset level ranges. If the number of level ranges is the same as the number of times when the battery cell 10 is discharged, the termination step (S400) is performed not to monitor the battery cell 10 any further. If the number of level ranges is different from the number of times when the battery cell 10 is discharged, the monitoring step (S100) is performed again. For example, in a case where the level range 300 is set to include only one level range, i.e. the first level range 310, when the temperature of the battery cell 10 exceeds 60° C., the charged amount exceeds 97, and the non-used period exceeds one week, the discharging step (S250) performed. When the charged amount is 90 or less, the discharging is stopped. In this case, the conditions for the fifth determination step (S320) are satisfied because the number of preset level ranges is one and the number times when the battery cell 10 is discharged is also one, and accordingly, the termination step (S400) of terminating the monitoring is performed.

As another example, a case in which the level range 300 is set to include three level ranges up to the above-described third lever range 330 will be described. In the first level range 310, when the temperature of the battery cell 10 exceeds 60° C., the charged amount exceeds 97, and the non-used period exceeds one week, the discharging step (S250) is performed. When the charged amount is 90 or less, the discharging is stopped. In this case, while the number of level ranges is set as three, the number of times when the battery cell 10 is discharged is one. Thus, the monitoring step (S100) is performed again. When the monitoring step (S100) is performed again, the level range is preferably set as the second level range 320, and the charged amount when the battery cell 10 is discharged is also changed to 80 corresponding to the second level range 320.

When the temperature, charged amount, and non-used period values of the battery cell 10 measured in the monitoring step (S100) satisfy the second level range 320, and the battery cell 10 is discharged to have a charged amount of 80 or less, the monitoring step (S100) is performed again. At this time, the level range is set as the third level range 330, and the charged amount when the battery cell 10 is discharged is also changed to 50 corresponding to the third level range 330. When the battery cell 10 is discharged to have a charged amount of 50 or less, the monitoring step (S100) is not performed and the termination step (S400) is performed because the number of preset level ranges is the same as the number of times when the battery cell 10 is discharged. Since the level range 300 may be set in a plural number with different temperatures, charged amounts, and non-used periods as described above, even though a vehicle is left non-used for a long time, it is possible to appropriately discharge the battery cell 10 depending on the temperature, the charged amount, and the non-used period of the battery cell 10, thereby preventing generation of gas in the battery cell 10 in advance. As a result, it is possible to enhance the stability of the battery cell 10, and at the same time, prevent a degradation phenomenon in the battery cell 10, thereby making it possible to use the battery for a long time in the best state.

Figure 7:
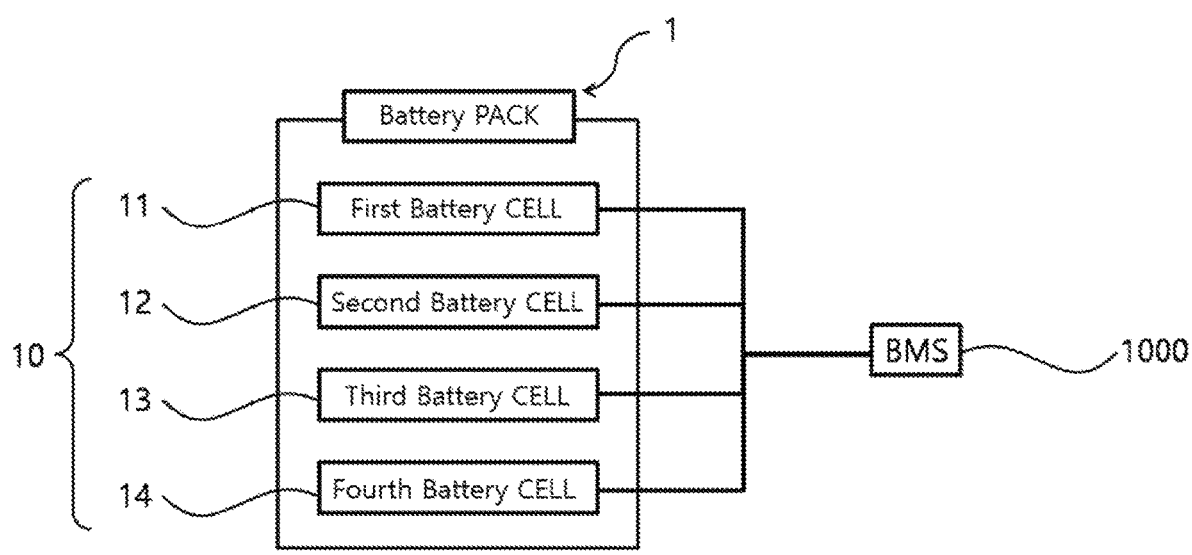
FIG. 7 illustrates a block diagram of a battery management system according to a modified exemplary embodiment of the present invention.

FIG. 7 illustrates a block diagram of a battery management system according to a modified exemplary embodiment of the present invention. As illustrated in FIG. 7, a battery pack 1 includes a plurality of battery cells 10. The battery management system 1000 according to the present invention controls each of the battery cells 10. In a case in which an average of respective temperature values of the battery cells 10 is calculated for measurement, when a temperature of a first battery cell 11 is 55° C., a temperature of a second battery cell 12 is 80° C., a temperature of a third battery cell 13 is 65° C., and a temperature of a fourth battery cell 14 is 45° C., the average temperature value of the battery pack 1 is 61.25° C., which satisfies the temperature range set for the first level range 310. However, there is a problem in that the first battery cell 11 and the fourth battery cell 14 unnecessarily discharged because they do not satisfy the temperature range set for the first level range 310.

In order to solve this problem, when the batter management system 1000 monitors each the plurality of battery cells 10, it is possible to prevent the batter cell 10 from being unnecessarily discharged. Reversely, in a case in which an average of respective temperature values of the battery cells 10 is calculated for measurement, when the temperature of the first battery cell 11 is 60° C., the temperature of the second battery cell 12 is 50° C., the temperature of the third battery cell 13 is 70° C., and the temperature of the fourth battery cell 14 is 55° C., the average temperature value of the battery pack 1 is 58.75° C., which does not satisfy the temperature range set for the first level range 310. However, the third battery cell 13, the temperature of which is 70° C., satisfies the temperature range set for the first level range 310. When the third battery cell 13 is not discharged based on the average temperature value, there is a possibility that gas may be generated in the third battery cell 13. Thus, it is preferable to monitor each of the battery cells 10.

Energy discharged from the battery cell 10 that monitored by the batter management system 1000 according to the present invention may be emitted to the outside, or may be used to operate an electronic device installed in the vehicle or charge a battery thereof. For example, the energy discharged from the battery cell 10 may be supplied as a power source of a black box that continues to capture video images during parking, may be used to lower or raise an internal temperature of the vehicle, or may be used to charge a battery of another device such as a navigation device or a Bluetooth-related product.

The battery management system having the above-described configuration according to the present invention is capable of preventing generation of gas in the battery in advance by deliberately discharging the battery to reduce a charged amount thereof when the temperature, the charged amount, and the non-used period are in the preset level range.

In addition, it is possible to prevent deterioration in performance of the battery due to gas generated in the battery, which causes a degradation phenomenon, in advance, thereby making it possible to provide a battery having high durability.

Since generation of gas is prevented in advance, a battery pouch is prevented from swelling and exploding due to generation of gas, thereby making it possible to provide a battery having high stability.

The present invention should not be construed as being limited to the above-described exemplary embodiments. The present invention may be applied to various fields and may be variously modified by those skilled in the art without departing from the gist of the present invention claimed in the claims. Therefore, it is obvious to those skilled in the art that these alterations and modifications fall within the scope of the present invention.

What is claimed is:

1. A battery management system for managing a battery pack including one or more battery cells, the battery management system comprising:
   a monitoring unit measuring state information of the battery cell; and
   a degradation management unit including a receiving unit receiving the state information of the battery cell from the monitoring unit, a determination unit determining whether a value of the received state information of the battery cell is in a preset level range, and a control unit controlling the battery cell to be discharged when the value of the received state information of the battery cell is in the preset level range, wherein the monitoring unit measures a temperature of the battery cell, a charged amount of the battery cell, and a non-used period during which the battery cell is left non-used while not being used, and the degradation management unit sets the level range for discharging the battery cell depending on the measured temperature, the charged amount, and the non-used period of the battery cell.

2. The battery management system of claim 1, wherein the level range is set in a plural number, and when the determination unit of the degradation management unit determines that a first level range is satisfied and the battery cell is discharged to have a predetermined charged amount, the monitoring unit monitors the battery cell until a second level range is satisfied.

3. The battery management system of claim 1, wherein the battery management system monitors a temperature and a charged amount of each battery cell independently, determines whether each battery cell satisfies the preset level range for discharging the battery cell, and controls discharging operation of each battery cell.

4. The battery management system of claim 1, wherein the battery management system monitors a temperature and a charged amount of each battery cell independently, determines whether the preset level range for discharging the battery cell is satisfied on basis of average values of temperatures and charged amounts of all of the battery cells, and controls discharging operation.

5. The battery management system of claim 1, wherein the battery management system uses energy discharged from the battery cell to operate an electronic device installed in a vehicle.

6. The battery management system of claim 1, wherein the battery management system uses energy discharged from the battery cell to operate an electronic device installed in a vehicle.

7. The battery management system claim 2, wherein the battery management system uses energy discharged from the battery cell to operate an electronic device installed in a vehicle.

8. The battery management system of claim 3, wherein the battery management system uses energy discharged from the battery to operate an electronic device installed in a vehicle.

9. The battery management system of claim 4, wherein the battery management system uses energy discharged from the battery cell to operate an electronic device installed in a vehicle.

10. A battery management method using the battery management system of claim 1, the battery management method comprising:

a monitoring step of measuring a temperature, a charged amount, and a non-used period of the battery cell;

a high temperature exposure non-using storage level changing step of discharging the battery cell when values measured in the monitoring step satisfies the preset level range; and a stabilization level returning step of measuring a charged amount of the battery cell discharged in the high temperature exposure non-using storage level changing step and stopping the discharging of the battery cell when the measured charged amount is equal to or smaller than a predetermined charged amount, wherein the level range is set in a plural number on the basis of the temperature of the battery cell, the charged amount of the battery cell, and the non-used period of the battery cell.

11. The battery management method of claim 10, wherein the battery management method is repeated as many as the number of preset level ranges.

12. The battery management method of claim 11, wherein criteria for the level range are changed each time the battery management method is repeated.

13. The battery management method of claim 10, further comprising using energy discharged from the battery cell to operate an electronic device installed in a vehicle.

14. The battery management method of claim 10, further comprising using energy discharged from the battery cell to operate as electronic device installed in a vehicle.

15. The battery management method of claim 11, further comprising using energy discharged from the battery cell operate an electronic device installed in a vehicle.

16. The battery management method of claim 12, further comprising using energy discharged from the battery cell operate an electronic device installed in a vehicle.

17. A battery management system for managing a battery pack including one or more battery cells, the battery management system comprising:

a monitoring unit measuring state information of the battery cell; and a degradation management unit including a receiving unit receiving the state information of the battery cell from the monitoring unit, a determination unit determining whether a value of the received state information of the battery cell is in a preset level range, and a control unit controlling the battery cell to be discharged when the value of the received state information of the battery cell is in the preset level range, wherein the monitoring unit measures a temperature of the battery cell, a charged amount of the battery cell, and a non-used period during which the battery cell is left non-used while not being used, and the degradation management unit sets the level range for discharging the battery cell depending on the state information.

* * * * *